United States Patent [19]

Anderberg

[11] 4,269,611
[45] May 26, 1981

[54] APPARATUS FOR DRYING OR DEHUMIDIFYING GASES

[76] Inventor: Erling L. Anderberg, Sverigesvej 2, DK-4200, Slagelse, Denmark

[21] Appl. No.: 39,604

[22] Filed: May 16, 1979

Related U.S. Application Data

[63] Continuation-in-part of Ser. No. 8,841, Feb. 2, 1979, abandoned, which is a continuation of Ser. No. 867,981, Jan. 9, 1978, abandoned.

[30] Foreign Application Priority Data

Jan. 10, 1977 [DK] Denmark ................. 85/77

[51] Int. Cl.³ ............................................. B01D 53/04
[52] U.S. Cl. ........................................ 55/179; 55/208;
55/387; 55/389
[58] Field of Search ................... 55/31, 33, 34, 74, 75, 55/78, 162, 179–181, 208, 387–390

[56] References Cited

U.S. PATENT DOCUMENTS

| | | | |
|---|---|---|---|
| 1,787,714 | 1/1931 | Barnebey | 55/208 X |
| 1,912,784 | 6/1933 | Miller et al. | 55/208 X |
| 2,344,384 | 3/1944 | Altenkirch | 55/179 X |
| 2,396,474 | 3/1946 | Riley | 55/208 X |
| 2,588,339 | 3/1952 | Anderegg | 55/387 X |
| 2,671,525 | 3/1954 | Asker | 55/33 X |
| 2,751,033 | 6/1956 | Miller | 55/181 |
| 2,975,860 | 3/1961 | Westeren | 55/179 |
| 2,979,828 | 4/1961 | Westeren | 55/179 X |
| 3,176,446 | 4/1965 | Siggelin | 55/34 X |
| 3,231,512 | 1/1966 | Harter | 55/208 X |
| 3,398,510 | 8/1968 | Pennington | 55/208 X |
| 3,487,608 | 1/1970 | Graff | 55/33 |
| 3,490,201 | 1/1970 | Colvin et al. | 55/208 X |
| 3,498,024 | 3/1970 | Calvert, Sr. | 55/389 X |
| 3,594,990 | 7/1971 | Hawley | 55/208 X |
| 3,733,791 | 5/1973 | Dravnieks | 55/390 |
| 3,800,515 | 4/1974 | Asker et al. | 55/387 |
| 3,844,737 | 10/1974 | Macriss et al. | 55/389 X |
| 4,209,308 | 6/1980 | Blodgett | 55/181 X |

FOREIGN PATENT DOCUMENTS

38-4315 4/1963 Japan ........................ 55/390

Primary Examiner—Robert H. Spitzer
Attorney, Agent, or Firm—Dennison, Meserole, Pollack & Scheiner

[57] ABSTRACT

An apparatus for dehumidification of gas by means of a moisture adsorbing medium arranged in relative thin layers separated by heating elements for heating the adsorbing medium during regeneration. The heating element preferably comprises a sheet material having a printed circuit thereon. The adsorbing medium may be arranged in a plurality of separate chambers defined in a common housing having an inlet for gas to be dehumidified and an outlet for dehumidified gas. In operation gas to be dehumidified flows from the gas inlet through the majority of the chambers and the adsorbing medium contained therein. A small fraction of dehumidified gas is directed from the outlet through the adsorbing medium in the remaining chamber or chambers towards the gas inlet, and the adsorbing medium in this chamber or these chambers is at the same time heated by the heating elements in order to regenerate the adsorbing medium. At predetermined time intervals the chamber or chambers in which the regeneration takes place, are changed.

36 Claims, 17 Drawing Figures

APPARATUS FOR DRYING OR DEHUMIDIFYING GASES

CROSS-REFERENCE TO RELATED APPLICATIONS

This application is a continuation-in-part application of application Ser. No. 8,841 filed on Feb. 2, 1979 which in turn is a continuation application with respect to applicant's application Ser. No. 867,981 filed on Jan. 9, 1978 both now abandoned.

BACKGROUND OF THE INVENTION

1. Field of the Invention

The present invention relates to an apparatus for dehumidification of gas and comprising a regenerable vapor or moisture adsorbing medium or adsorbent. Such apparatuses for dehumudification of air or other gaseous mediums may, for example, be used for dehumidifcation of air in pressurized air systems and in rooms, and for dehumidification of gas or air which is used in manufacturing processes, etc.

2. Description of Prior Art

The prior art comprises apparatuses of that type in which the adsorbing medium or adsorbent is divided into a plurality of layers in order to obtain a more uniform distribution of gas flow over the cross-sectional area of the adsorbent used (such aparatuses are disclosed for example in U.S. Pat. Nos. 3,490,201 and 3,594,990). When the adsorbing medium or adsorbent has been used for a certain period of time and enriched with a certain amount of moisture it must be regenerated. This may be done by passing heated air through the adsorbent (U.S. Pat. No. 3,490,201) or by directly heating the adsorbent and simultaneously passing air from the ambient atmosphere therethrough (U.S. Pat. No. 3,594,990). The first mentioned regenerating procedure involves a relatively high loss of heat energy while the latter procedure is more advantageous from a heat economical point of view. However, in the known apparatus in which the adsorbing medium is divided into a plurality of layers, each of which is heated by electrical heating means during the regenerating step (U.S. Pat. No. 3,594,990), the layers of adsorbing medium are confined to small amounts of a desiccant, such as lithium chloride, deposited on heating wires by impregnation of asbestos yarn covering said wires. It is understood that the cost of the electrical heating device included in that known structure is relatively high compared to the adsorbing capacity of the adsorbent or desiccant supported by the heating device.

While some of the known apparatuses are operating intermittently, because the adsorbing and regenerating processes are alternating for the complete amount of adsorbent in the apparatus, other known apparatuses (disclosed for example in U.S. Pat. Nos. 3,487,608 and 3,490,201) may operate continously.

SUMMARY OF THE INVENTION

The present invention provides an improved apparatus for dehumidification of gases, said apparatus comprising a housing defining a plurality of separate chambers therein and having an inlet end defining an inlet for gas to be dehumidified, and an outlet end defining an outlet for dehumidified gas, each of said chambers or passages communicating at its opposite ends with said gas inlet end and said gas outlet end, respectively, a regenerable moisture adsorbing medium arranged within each of said chambers or passages, said adsorbing medium being divided into a plurality of adjacent spaced layers, selectively energizeable electrical heating means arranged within each of said chambers or passages and extending between adjacent layers of adsorbing medium therein and in contact with each such layer, means for directing gas to be dehumidified from said inlet end through a first group of said plurality of chambers or passages, said plurality of chambers comprising a first group and a second group, means for simultaneously redirecting a flow of dehumidified gas from said outlet end through said second group of chambers or passages, and means for energizing said heating means in each of the chambers or passages in said second group for a period of time sufficient to regenerate adsorbing medium therein while dehumidified gas is being directed therethrough.

In the apparatus according to the invention the electrical heating means are arranged between adjacent layers of adsorbing medium or adsorbent so that each single layer—which may have a suitably small thickness—may be directly heated on both sides by the heating means during the regenerating process. This effective direct heating on the adsorbent involves that only a relatively small amount of dehumidified gas is required for the regenerating process, and, therefore, a very advantageous heat economy may be obtained by using the apparatus according to the invention. Furthermore, the arrangement of the electrical heating means or heating elements between adjacent layers of the adsorbent substantially facilitates assembling of the apparatus and also facilitates later replacement of possible defective heating elements.

The adsorbing efficiency of the adsorbing medium normally decreases when the temperature thereof increases. Therefore, it is important that the adsorbent be cooled after the regeneration process before the adsorbent is reused in another adsorption process. This may, for example, be obtained by flowing cold air or gas through the adsorbent for a certain period of time after deenergizing the heating means.

Adsorption of moisture or vapor by the adsorbent normally involves generation of heat whereby the temperature of the adsorbent and the gas flowing therethrough is increased. A higher temperature of the gas to be dehumidified causes the relative humidity of the gas to decrease. As the moisture adsorbing ability of adsorbents is to a great extent dependent on the relative humidity of the gas the generation of adsorption heat may have the effect that the efficiency of the adsorbing medium becomes rather small in a zone at the downstream end of the respective chamber. In some cases, for example in heavy duty apparatuses having a high potential adsorption capacity, it may be advantageous to counteract the temperature increased due to generation of adsorption heat. According to the invention the moisture adsorbing medium in each of said chambers or passages may then be divided into axially spaced sections, and cooling means of any suitable type may then be arranged between such sections for cooling the gas flowing through the respective chambers.

The layers of the adsorbing medium in each of said chambers or passages may extend in a substantially longitudinal direction of the respective chamber or passage, i.e. in substantially the same direction as that in which gas to be dehumidified flows through the chamber. Adjacent layers of the adsorbing medium may then be separated by the heating means for heating the adsorbent during the regenerating process. Depending on the type of adsorbing medium or adsorbent the layers of adsorbent may be arranged in spaced relationship so that flow passages for the gas to be dehumidified are defined between the layers, or the gas flow may be directed through the respective layers of adsorbent. Especially in the latter case the heating means arranged between the layers of adsorbent preferably comprise sheet material separating the layers of adsorbing medium. The said sheet material which may form a barrier to gas flow then defines separate gas flow passages in the respective layers of adsorbent. The said separating sheet material is preferably made from heat resistant plastic and may include printed resistance circuits. If the layers of adsorbent are arranged in spaced relationship, the heating means may advantageously comprise electric heating wires extending between rod-like spacer members arranged between said adjacent surfaces of the adsorption medium layers. By using the heating means as spacing between adjacent layers of the adsorption medium a special simple structure is obtained. During the regeneration process the amount of heat necessary for the regeneration is provided by the electric heating wires, and the heat provided is almost directly transferred to the liquid which is adsorbed in the adsorbing medium and which is to be evaporated. Because the heating means are almost uniformly distributed along the surfaces of the adsorption medium an effective utilization of that medium may be obtained.

The layers of adsorbent may, alternatively, extend in a direction transverse to the direction of gas flow through the respective chambers. Each layer may then be supported by a respective one of a plurality of gas-penetrable supporting members which are of a heat conductive material and heat conductively interconnected. Thus, these heat conductive supporting members tend to equalize the temperatures in various zones of the adsorbing medium in each of the chambers so that the efficiency of the adsorbing medium also becomes uniform in these various zones. Furthermore, the heating means may be common to several of and preferably all of the supporting members in each chamber, and be in heat conductive contact therewith. Then, during the regeneration process it is possible to heat all parts of the adsorbing medium by means of heating means, such as an electric heating element, arranged centrally within the chamber.

The said gas redirecting means may comprise a valve adapted to cut off the communication between said gas inlet at the adjacent end or ends of said second group of chambers and to connect said chamber end or ends to the atmosphere. Preferably, the said housing is substantially cylindrical and said valve is a rotary valve arranged centrally at one end of the chambers or passages each having a sector-like cross-sectional shape and being arranged annularly and substantially coaxial with said valve. When such embodiment of the apparatus is operating, the gas to be dehumidified flows from the common gas inlet through said first group of chambers or passages and the adsorbing medium contained therein to the common gas outlet. Only in said group of chambers or passages which preferably constitute a minority, for example one or two chambers, dehumidified gas flows in the opposite direction from the common gas outlet through the second group of chambers and out into the atmosphere or into another discharge recipient. As the heating means are simultaneously activated in said second groups of chambers an effective regeneration of the adsorbing medium contained therein will take place. In the apparatus according to the invention a certain fraction of the total amount of adsorbing medium is at any time being regenerated so that continuous operation of the apparatus is made possible.

In the apparatus according to the invention the regeneration process takes place quickly and efficiently. Therefore, an apparatus containing a relatively small amount of adsorbing medium or adsorbent may have a rather high capacity. A reduction in the amount of adsorbent necessary involves a substantial reduction of the flow resistance in the apparatus. Consequently, even a high capacity apparatus may have such a low flow resistance that it may be used not only for dehumidification of pressurized air, but also for dehumidification of air at atmospheric pressure which may be passed through the apparatus by means of a blower.

According to another aspect the present invention comprises an apparatus for dehumidification of gas and comprising a housing having a gas inlet and a gas outlet at opposite ends and defining at least one chamber therein, a regenerable and gas pentrable moisture adsorbing medium arranged within said chamber and being divided into a plurality of adjacent layers, selectively energizeable electrical heating means arranged between and in contact with said adjacent layers of adsorbing medium so as to separate said layers of adsorbing medium and so as to define a gas flow passage through each of said layers. Such structure secures a uniform distribution of the gas to be dehumidified over the total cross-section of the bed of adsorbent and an intimate contact between the gas and the adsorbent. Furthermore, the arrangement of the heating means between the layers of adsorbent or adsorbing medium secures a quick and effective regeneration of the adsorbent. If the apparatus comprises only one chamber or container in which the adsorbent is arranged, the adsorption and regeneration processes may take place alternately in a known manner. However, the apparatus preferably comprises two or more chambers or containers. In that case regeneration of the adsorbent may take place in one or more chambers while adsorption is taking place in remaining chambers or containers.

The adsorbent or adsorbing material may comprise any known adsorbing materials, such as molecular sieves, silica gel, activated alumina, synthetic mineral fibers, and ceramic fibers. The adsorbent may be a particulate material or a sheet or web material. Such sheet or web material may, for example, be in the form of an asbestos band, an asbestos sheet, an asbestos web, or an asbestos panel impregnated with a hygroscopic material such as lithium chloride. The term "sheet or web material" in the present context is intended to comprise all variances in which such materials may be available or into which such materials may be shaped, such as webs, rolls, bands, tubes, etc., all of which provide a large surface and the possibility of obtaining suitable gas paths. However, the sheet or web material may in itself (i.e. without impregnation with a hygroscopic impregnating agent) have a structure consisting of or containing a considerable amount of structural elements, that is particles or fibers with inherent good moisture adsorption properties, and for the dehumidification of gas it may be advantageous to use such sheet or web material which consists of or contains structural elements, i.e. particles and/or fibers, which exert the liquid adsorbing activity or the predominant part thereof. It has been found that suitable sheet or web materials for use as liquid adsorbing media, especially water adsorbing media, are such consisting of or comprising considerable amounts of synthetic mineral fibers. Examples of synthetic mineral fibers are mineral wood fibers and ceramic fibers such as kaolin wool fibers, and quite generally, such synthetic fiber materials will be suitable which in an adequately fine fiber structure contain substantial amounts of aluminum oxide and/or silicate in the various forms and mineral compounds of these. These sheet or web materials of mineral fibers should, preferably, be used in a form in which they have their best possible regenerable liquid adsorption properties, i.e. they should not be used in a form in which the fibers are coated with impregnating agents reducing their regenerable liquid adsorption properties. Thus, for example, mineral wool sheets or webs should be used in non-impregnated form.

A suitable fiber material for use in an apparatus according to the invention is a ceramic fiber material prepared from kaolin wool fibers which in turn are prepared by blowing air through a bath of molten kaolin of high purity. A commercial version of a material of this kind is "Triton Kaowool" which is sold as a heat and sound insulating material. The material has a melting point above 1760° C., an average fiber diameter of 2.8μ, a fiber length of 12–250 mm, a fiber tensile strength of $1.4 \times 10^4$ kg/cm$^2$, and a density of 2.56. The chemical analysis is as follows:

$Al_2O_3$: 43–47%
$SiO_2$: 50–54%
$Fe_2O_3$: 0.6–1.8%
$TiO_2$: 1.2–3.5%
MgO: traces
CaO: 0.1–1.0%
Alkalies as $Na_2O$: 0.2–2.0%
$B_2O_3$: 0.06–0.1%

Trace amounts of inorganic materials: 0.2–0.3%
This sheet or web material of kaolin fibers is suitably used in the form of webs having a thickness of the order of 1 mm, suitably for example 0.5 mm. Experiments have shown that this material has excellent properties as an adsorption medium for use in gas dehumidifying apparatuses because it has high water adsorption, is resistant to free water, shows high temperature resistance, exerts little resistance to the passage of gas and is easily regenerable.

BRIEF DESCRIPTION OF THE DRAWING

The invention will now be further described with reference to the drawings, wherein.

DESCRIPTION OF THE PREFERRED EMBODIMENTS

The apparatus or dehumidifier shown in FIGS. 1–4 comprises a stationary cylindrical housing 10 which by means of a number of radially extending partition walls 11 is divided into a plurality of sector-shaped passages or chambers 12 open at opposite ends. At one end the housing 10 is provided with an inlet tube 13 for humid gas or air, and at its other end the housing is provided with an outlet tube 14 for dried or dehumidified gas or air.

Figure 3:
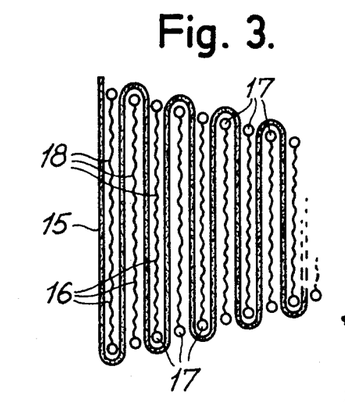
FIG. 3 is an end view in a somewhat enlarged scale of a folded sheet-like adsorption material having heating elements arranged between the adjacent surfaces thereof.
Figure 4:
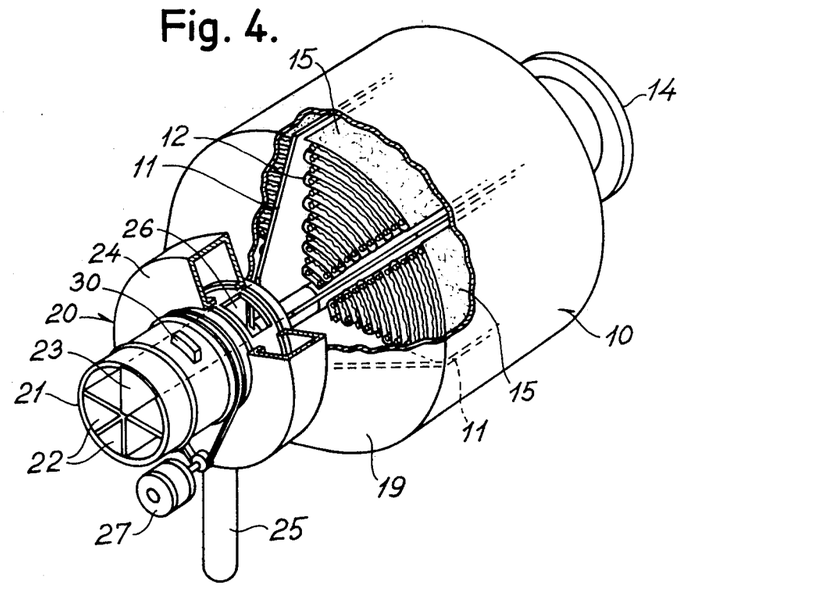
FIG. 4 is a perspective and partially sectional view of the apparatus or dehumidifier shown in FIGS. 1 and 2.

Each of the sector-shaped chambers 12 is substantially filled with a folded or pleated sheet-like adsorbing medium or adsorbent 15 which may, for example, be a fibrous material which is liquid adsorbing in itself or impregnated with a suitable hygroscopic substance. Electric heating elements 16 are arranged between adjacent layers of the sheet-like adsorbing medium, vide FIG. 3. As shown in FIG. 3 each of these heating elements 16 may include rod-shaped members 17 extending in the longitudinal direction of the housing 10 and serving as a frame or as supporting elements for electric heating wires 18 extending therebetween and being arranged in closely spaced relationship over almost the full axial length of the chambers 12. The members 17 also serve as spacing members keeping the adjacent layers of the sheet-like material apart so as to form flow passages for the gas flowing through the chambers of the apparatus.

At one end the chambers 12 have a common end wall 19 defining a central gas inlet opening communicating with all of the chambers 12. A rotatable valve 20 is mounted between this gas inlet opening and the inlet tube 13. The rotatable valve 20 has a tubular valve body 21 which is divided into a number of sector-shaped passages 22 corresponding to the number of chambers 12, and one of these passages 22 is closed at its outer end by means of a closing wall 23. The valve body 21 is surrounded by a stationary discharge manifold 24 connected to the atmosphere via an exhaust pipe 25. The inner space of the manifold is constantly communicating with the valve body passage 22 which is closed by the closing wall 23, through an opening 26 (FIG. 4) in the outer peripheral wall of the valve body 21. The valve body 21 may be rotated stepwise by means of an electric motor 27 and a belt drive 28. Electric switching means 29 are associated with each of the chambers 12 and adapted to energize all of the heating elements 16 in the respective chamber when actuated. The switching means are actuated by a cam 30 formed on the outer surface of the rotatable valve member 21. The switching means 29 of which only those associated with one of the chambers 12 are shown, are arranged in such a manner that the electric heating elements in any of the chambers 12 are energized at substantially the same time as when the passage 22 of the valve body provided with the closing wall 23 was moved to a position in which it is aligned with the chamber in question.

Atmospheric air or another gas to be dehumidified or dried is passed into the apparatus or dehumidifier through the inlet tube 13, for example by means of a blower, not shown. The valve 20 allows the gas to flow from the inlet tube 13 to the outlet tube 14 through all of the chambers 12 other than that aligned with the passage of the valve body 21 closed by the wall 23. The electric heating elements 16 arranged in the chambers 12 through which the humid gas is flowing are not energized. When flowing through the flow passages defined between the adjacent layers of the adsorbing medium 15 the humid gas comes into intimate contact with the cold adsorption medium whereby the gas is freed from a substantial part of its moisture content.

Figure 1:
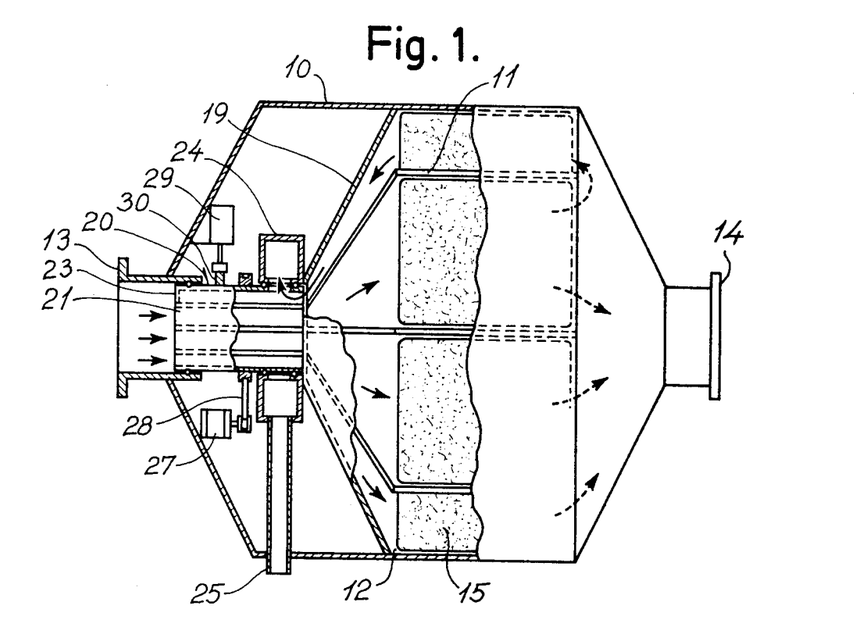
FIG. 1 is a side view and partially sectional view of an apparatus or a dehumidifier according to the invention.
Figure 2:
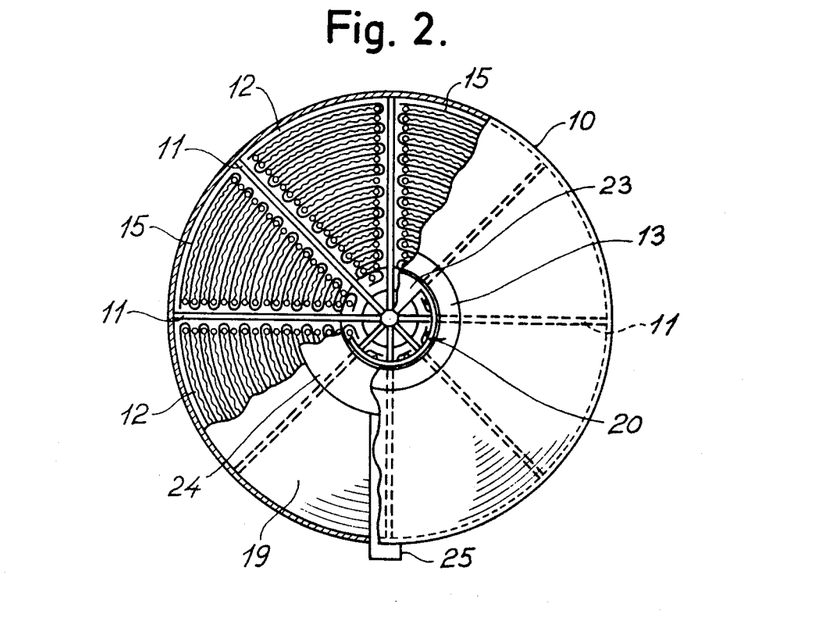
FIG. 2 is an end view and partially sectional view of the apparatus or dehumidifier shown in FIG. 1.

In FIG. 1 the uppermost of the chambers 12 is communicating with the closed passage of the valve body 21 and, consequently, also with the atmosphere via the discharge manifold 24 and the exhaust pipe 25. At the end of the housing 10 adjacent to the outlet 14 the gas pressure exceeds the atmospheric pressure and, consequently, part of the gas which has been dehumidified by flowing through the other of the chambers 12 tends to flow back through the chamber 12 communicating with the closed passage of the valve body 21 and out into the atmosphere via the opening 26, the manifold 24, and the pipe 25 as indicated by arrows in FIG. 1. The switching means 29 associated with the said chamber 12 have been actuated by the cam 30 when the closed passage was rotated to its position in alignment with the chamber 12 in question. Therefore, the electric heating elements 16 in that chamber 12 are energized and are causing a substantially uniform heating of the surfaces of the adsorbing medium 15 whereby heat is supplied to the adsorbed liquid so as to evaporate the same.

The resistance to gas flow through the chamber 12 in which the adsorbing medium is regenerated and out into the atmosphere via the exhaust pipe 25 is adjusted with regard to the existing pressure differences in such a manner that substantially only the volume of gas necessary for transporting the liquid or moisture given off from the adsorbing medium 15 within the chamber is used for the regeneration process. After a suitable time interval the valve body 21 is rotated one step forward by the motor 27 whereby another of the chambers 12 is aligned with the closed passage of the valve body 21. Simultaneously, the corresponding switches means 29 are actuated by the cam 30 so as to energize the heating element 16 within the chamber in which the adsorbing medium is now to be regenerated. The switching means 29 are preferably adapted to switch off the electric current to the heating elements after a predetermined period of time which is shorter than the regenerating period of the adsorbing medium in the chamber in question so that the adsorbing medium therein may be cooled before it is subsequently contacted by a flow of humid gas.

It should be understood, that regeneration of the adsorbing medium in the separate chambers 12 may take place in any desired order provided that the adsorbing medium in any of the chambers is regenerated at suitable time intervals. It is also possible to rotate the valve body 21 continuously at a very low rotational speed.

Figure 5:
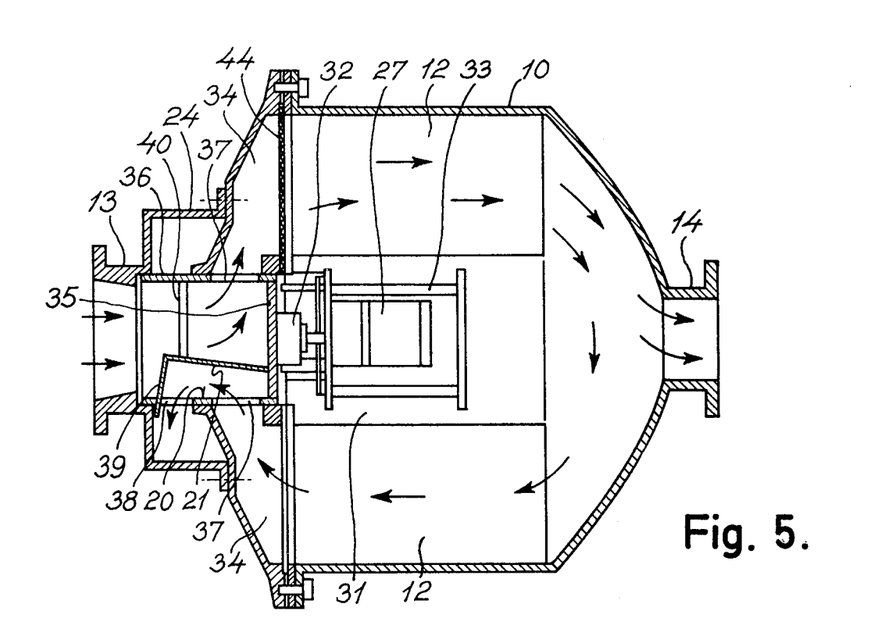
FIG. 5 is a longitudinal sectional view of a second embodiment of the apparatus or dehumidifier according to the invention.
Figure 6:
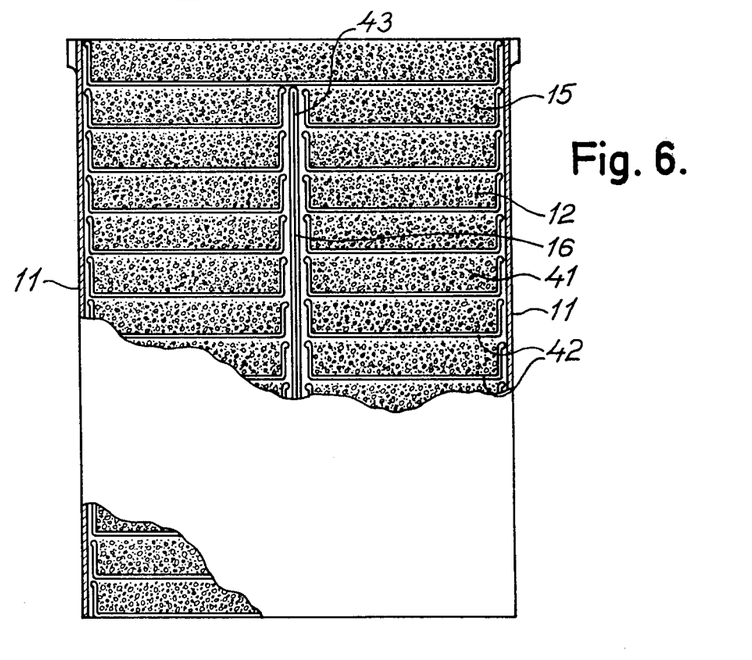
FIG. 6 is a side view and partially sectional view of an apparatus chamber.
Figure 7:
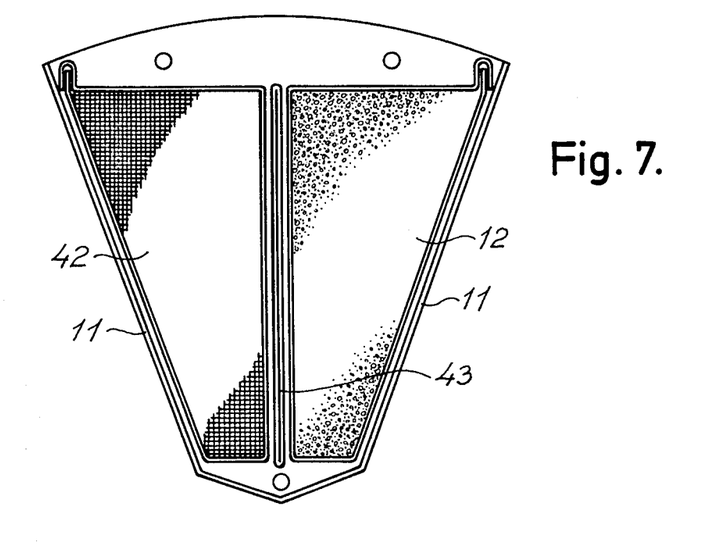
FIG. 7 is a plan view of the chamber shown in FIG. 6.

FIGS. 5–7 show other embodiments of the apparatus or dehumidifier according to the invention, and corresponding parts of the embodiments shown in FIGS. 1–4 and in FIGS. 5–7, respectively, are provided with like reference numerals.

In the embodiment shown in FIG. 5 the sector-shaped chambers or passages 12 are positioned in an annular arrangement so that they surround and define a central space 31 in which the driving motor 27, which is a geared motor, and a coupling 32 as well as the motor control means are mounted in a frame 33. The ends of the chambers or passages 12 adjacent to the inlet tube 13 are communicating with that tube through connecting passages 34 and via the rotating valve 20. The valve body 21 of the valve 20 has an end wall 35 and a cylindrical wall 36 fastened thereto. Openings 37 are formed in the cylindrical wall 36 and positioned so that all of the chambers 12 are communicating with the inner space of the valve body 21 through these openings in all rotational positions of the valve body. The cylindrical wall 36 also has an opening 38 communicating with the discharge manifold 24. A partition wall 39 which is supported by a supporting tube 40 and arranged within the valve body 21 is adapted to connect the opening 38 with one of the openings 37 and to cut off the communication between these two openings and the inlet tube 13.

In the apparatus or dehumidifier shown in FIG. 5 the gas to be dehumidified is passed into the inlet tube 13 through the inner of the valve body 21, through the openings 37 which are not covered by the partition wall 39, through the connecting passages 34 into the chambers 12 and the adsorbing medium contained therein, and the dehumidified or dried gas leaves the apparatus through the outlet tube 14. As the gas pressure at the end of the housing 10 adjacent to the outlet tube 14 exceeds the atmospheric pressure, part of the dehumidified gas tends to flow back through the chamber 12 having its connecting passage 34 positioned opposite to the partition wall 39, as indicated by arrows in FIG. 5.

As explained in connection with the first embodiment described above the adsorbing medium is simultaneously heated in the respective chamber, whereby the adsorbing medium is regenerated. Automatic control means control the motor 27 so that the valve body 21 is rotated a step forward at certain predetermined time intervals so as to bring the partition wall 39 into a position opposite to another of the openings 37, whereby this opening is connected to the discharge manifold 24 and consequently to the atmosphere. In this manner the adsorbing medium in any of the chambers 12 will be regenerated after having been used for a predetermined period of time.

In the chambers 12 of the apparatus shown in FIG. 5 a folded sheet-like adsorbing medium 15 as that described in connection with the embodiment of FIGS. 1–4 may be used. FIGS. 6 and 7 show an embodiment of the chambers 12 in which the adsorbing medium 41 may have the form of a loosely arranged particulate or fibrous material. In that case the apparatus is preferably, but not necessarily, positioned so that its longitudinal axis is substantially vertical. In the embodiment shown in FIGS. 6 and 7 each of the chambers 12 contains a number of superposed tray-like, gas-penetrable supporting members 42 which may, for example, be made from perforated sheet metal. The supporting members 42 are, however, preferably made from wire mesh. These tray-like supporting members are arranged so as to be in direct heat-conductive contact with each other, and a plate- or sheet-like electric heating element 43—which may, for example, be of the type used for defrosting automobile panes or of the type shown in FIG. 3—is arranged centrally in each of the chambers 12. The heating element 43 extends transversely to the supporting members 42 and is arranged so as to be in heat-conductive contact with all of the tray-like supporting members in the chamber. As indicated above, the adsorbing medium 41 may be a particulate or fibrous material which is loosely arranged in each of the tray-like members 42 the uppermost of which may be closed by means of a wire mesh 44 or another suitable gas-penetrable covering medium. However, the adsorbing medium may, alternatively, be a sheet material which is arranged in the tray-like members, or the adsorbing medium may be fastened to these members. In the latter case the apparatus or dehumidifier may be orientated in any desired manner.

When gas to be dehumidified flows through the chambers 12 and the adsorbing medium 41 contained therein, this medium will adsorb moisture from the gas as explained above. As mentioned above, the liquid adsorption causes an increase in temperature so that temperature of the adsorbent tends to increase in the direction of gas flow. However, the heat-conductive contact between the tray-like members 42 causes an equalization of temperature in each respective chamber 12 whereby it is secured that the adsorbing medium may be equally utilized in all zones of the chamber. Also when the heating element 43 is energized during the regeneration process the supporting members 42 are utilized because they serve to distribute the heat generated by the heating element 43 to all parts of the adsorbing medium. It is apparent that the structure described permits use of heating elements which are substantially cheaper than those shown in the embodiment shown in FIGS. 1-4. Furthermore, a centrally positioned heating element 43 of the type shown in FIGS. 6 and 7 may easily and quickly be replaced if it is defective or becomes damaged.

Figure 8:
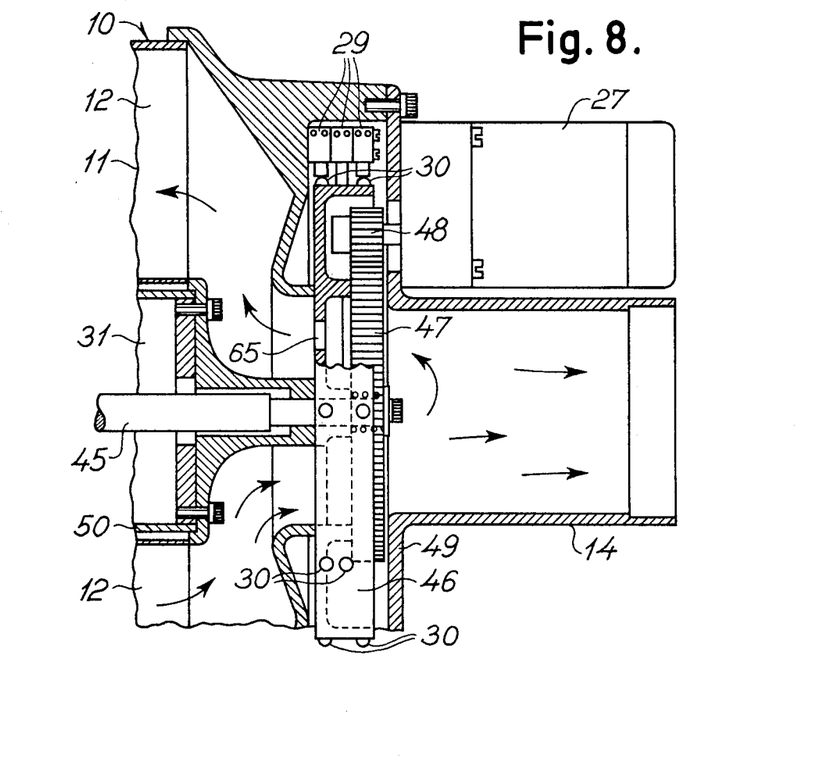
FIG. 8 is a sectional view of one end of a third embodiment of the apparatus or dehumidifier as shown in FIG. 9.
Figure 9:
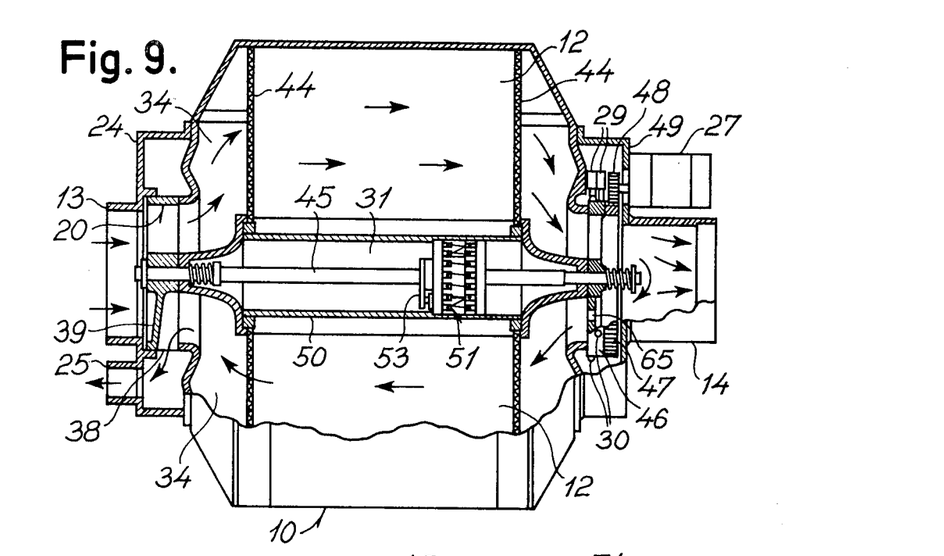
FIG. 9 is a side view and partially sectional view of the said third embodiment shown in a reduced scale.

FIGS. 8 and 9 show a further embodiment of the apparatus or dehumidifier according to the invention, and parts corresponding to those of the embodiments described above with reference to FIGS. 1-7 of the drawings have been provided with like reference numerals.

The rotatable valve 20 is mounted at one end of a central shaft 45 extending axially through the apparatus. At the end opposite to the rotatable valve 20 a switch actuating disc 46 having switch actuating projections or cams 30 positioned at the periphery thereof, is mounted. The disc 46 comprises a ring gear 47 engaging with a driving pinion 48 of the motor 27. The motor 27 is mounted on an end cover 49 which comprises the outlet tube 14 and is fastened to the adjacent end wall of the housing 10. The shaft 45 extends through a tubular inner housing 50 defining the central space 31. The inner housing 50 contains a rotary electrical switching device 51 comprising a stator part 52 engaging with the inner surface of the tubular housing 50, and a rotor 53 mounted on the shaft 45 so as to be rotatable therewith. The switching device 51 will be described more in detail below.

Figure 13:
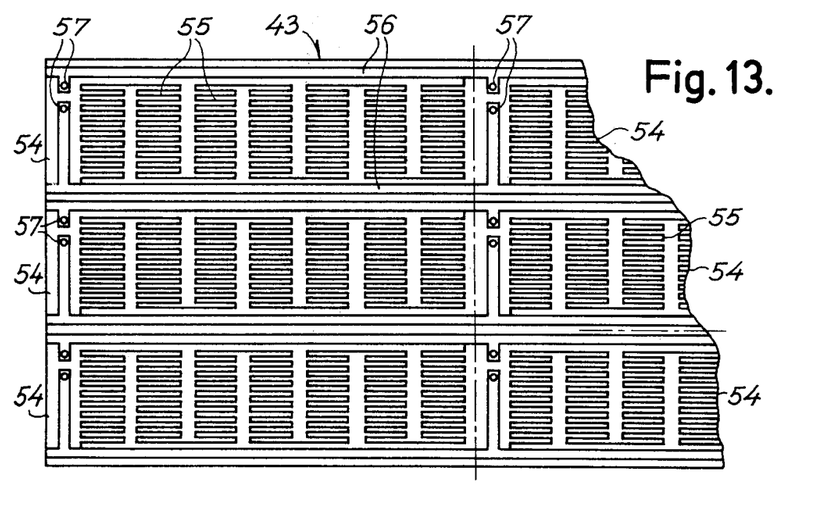
FIG. 13 is a plan view of a sheet material which may be used as heating elements in the apparatus according to the invention.

FIG. 13 illustrates a preferred embodiment of the electrical heating elements 43 and shows a web comprising a heat resistant sheet material and electrical circuits "printed" thereon by a usual circuit printing technique. The web material shown in FIG. 13 may be divided into a number of heating elements by cutting the web transversely, for example along the dot-and-dash line, indicated in FIG. 13. Each heating element 43 comprises three or a multiple of three modules 54 each including a printed circuit comprising a number of resistance elements 55 connected in series. The printed circuits of the web also comprise longitudinally extending bus lines 56 connecting the heating elements 55 of adjacent modules in parallel and being provided with connecting points 57 in each module.

The plastic sheet material used in the heating elements 43 shown in FIG. 13 may, for example, be that marketed by the 3M Company under the trade mark "KAPTON". This material is resistant to temperatures as high as 260°-270° C. The heating element 43 may be made by etching a foil of stainless steel laminated with the plastic film so as to obtain the desired printed circuit.

It is understood, that a sheet material with printed circuits as shown in FIG. 13 may be produced in the form of webs of any desired length, and heating elements containing any desired number of modules 54 may then be cut therefrom.

Figures 14, 15:
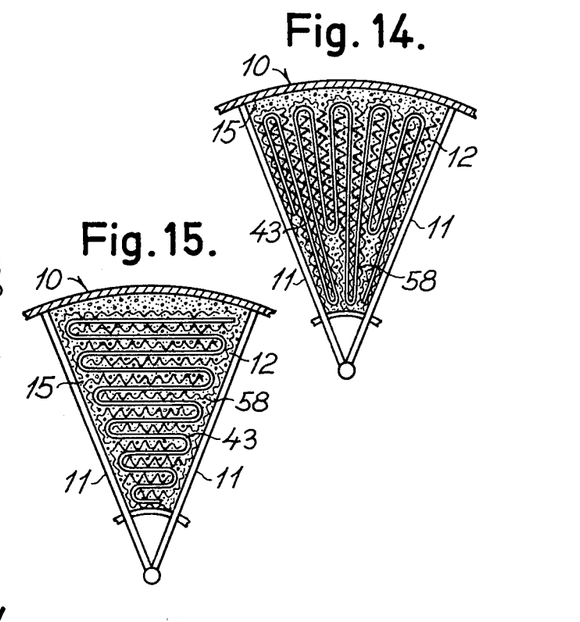
FIGS. 14 and 15 are views showing possible arrangements of the sheet-like heating elements in the chambers of the dehumidifier according to the invention.

A heating element 43 of the type shown in FIG. 13 is arranged in each of the chambers or passages 12 of the apparatus shown in FIG. 9. The heating element is preferably folded or pleated, for example as shown in FIGS. 14 or 15, and adjacent layers of the heating elements may be spaced by spacing members 58 arranged between said layers. These spacing members are preferably in the form of a corrugated sheet material, such as a woven heat resistant material, for example of polyester. The spacing members 58 may be impregnated with a hygroscopic material such as lithium chloride with cell structure. The spaces defined by the walls of the chambers 12, the spaced layers of the heating elements 43, and by the corrugated spacing members 58 are filled with a suitable fibrous or particulate moisture adsorbing medium 15, such as molecular sieves, silica gel, activated alumina, or any other suitable, regenerable adsorbent or hygroscopic substance. The distance between the spaced layers of the folded or pleated heating elements 43 should be sufficiently small to secure a quick and effective heating of the layer of adsorbent arranged there between. This distance may, for example, be in the order of 10 mm.

Figure 12:
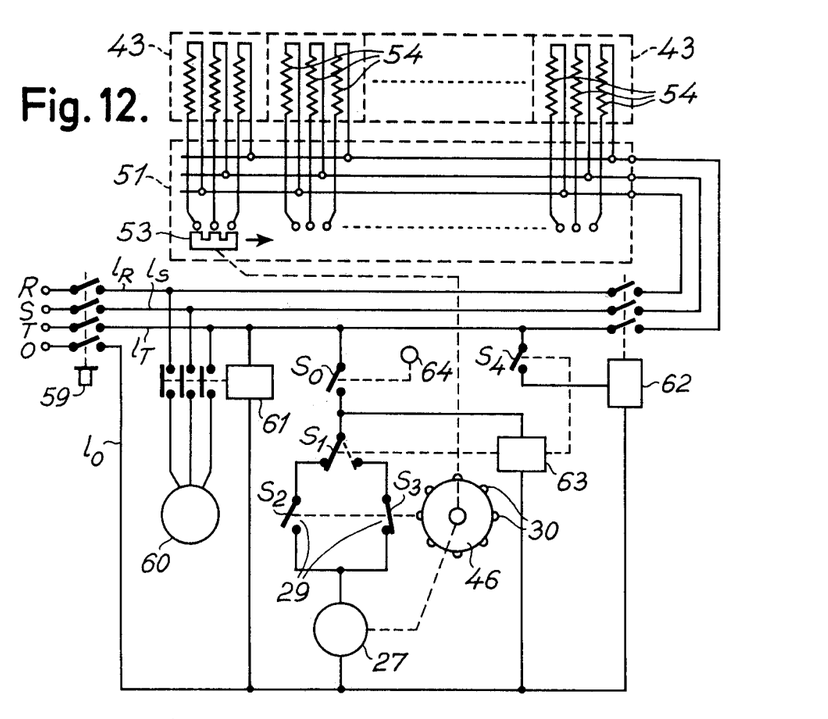
FIG. 12 is a diagram showing an electrical control system for controlling the function of any of the apparatuses shown in FIGS. 1, 5, and 9.

FIG. 12 is a diagram showing an electric control system for controlling the embodiment of the apparatus shown in FIGS. 8 and 9 and the control system will be explained with special reference to that embodiment. It should be understood, however, that a similar electric control system may be used for controlling the operation of any of the embodiments shown in FIGS. 1-7.

The drying or dehumidifying apparatus is adapted to be powered from a three-phase power supply and comprises power supply terminals R, S, T, and O. These terminals are connected to corresponding power supply lines $1_R$, $1_S$, $1_T$, and $1_O$, respectively. Power supply through these lines may be controlled by a main switch 59. Power supply through the lines $1_R$, $1_S$, and $1_T$ is used for energizing a blower 60 and selected ones of the heating elements 43 arranged within the chambers 12. Power supply to the blower 60 and to the heating elements 43 is controlled by contactors 61 and 62, respectively, or other suitable switching means. The blower 60 is used for blowing air or gas to be dried into the apparatus through the inlet tube 13. Operation of the motor 27 driving the shaft 45 and the switch actuating disc 46, the switching device 51, and the rotatable valve 20 mounted thereon is controlled by a clock-controlled contactor or switching device 63, a hygrostat 64 or another moisture sensitive device preferably positioned downstream of the dehumidifier and adjacent to the outlet tube 14 thereof, and by the projections or cams 30 on the switch actuating disc 46.

The hydrostate 64 controls a switch $S_0$ while the clock-controlled contactor 63 controls switches $S_1$ and $S_4$, and the switching means 29 includes switches $S_2$ and $S_3$.

The apparatus shown in FIGS. 8 and 9 functions substantially as those previously described in connection with FIGS. 1-7, which means that air or gas to be dried or dehumidified is passed through the majority of the chambers 12 and the adsorbent contained therein while a small fraction of the dried gas is returned and passed through the remaining minority of chambers 12 in the opposite direction so as to heat and regenerate the adsorbent or adsorbing medium in these chambers. At certain time intervals the chamber or chambers in which the adsorbent is being regenerated is/are changed, and this regeneration cycle is controlled by the electrical control system shown in FIG. 12.

When the main switch 59 is closed, the contactor 61 will automatically connect the blower 60 to the power supply lines $1_R$, $1_S$, and $1_T$ so that the blower will start blowing air or gas to be dried into the inlet tube 13. Assuming that the switches $S_0$–$S_4$ are in the positions shown in FIG. 12 the motor 27 is deenergized. Consequently, the valve 20 is stationary and allows air or gas to flow from the inlet tube 13 through a majority of the chambers or passages 12 to the outlet tube 14 as indicated by arrows in FIG. 9. However, a substantially radially extending wall of the valve 20 closes the passage from the inlet tube into a minority, preferably two, of the chambers 12, and simultaneously the valve communicates this minority of chambers with the manifold 24 through an opening 38. Consequently, dry gas may flow from the outlet tube into the said minority of chambers through one or more flow restricting openings 65, and from the chambers out into the atmosphere through the manifold 24 and the exhaust pipe 25. After a predetermined period of time the clock-controlled contactor or timer 63 closes the switch $S_1$. Unless the hygrostat 64 ascertains that the moisture content of the gas leaving the outlet tube 14 is below a predetermined value, the switch $S_0$ has also been closed by the hydrostat 64 whereby power is supplied to the motor 27 through the closed switches $S_0$, $S_1$ and $S_3$. The motor 27 now rotates the rotor 53 of the switching device 51 and the valve 20 one step forward corresponding to an angular rotation of 360°/n where n is the number of sector-like chambers or passages 12 in the apparatus. The new angular position of the valve will be determined by cams or projections 30 on the actuating disc 46 opening the switch $S_3$ and simultaneously closing the switch $S_2$. When the valve 20 has been moved to its new position the contactor 63 closes the switch $S_4$ causing the contactor 62 to supply power to the heating elements 43. However, as illustrated in FIG. 12, only the heating elements which are short-circuited by the rotor 53 will be energized. In the preferred embodiment the apparatus shown in FIGS. 8 and 9 defines six chambers or passages 12 therein, and the valve 20 is adapted to allow gas to be dried to flow through four of these chambers while a small fraction of the dried gas is returned through the remaining two of the chambers in which the adsorbing medium is being regenerated. The motor 27 is controlled so as to rotate the valve 20 and the rotor 53 of the switching device 51 stepwise in angular steps of 60°. Consequently, the regeneration period for the adsorbent in each chamber is twice the time intervals at which the clock-controlled contactor 63 actuates the switches $S_1$ and $S_4$. In each diameter or passage 12 the heating elements 43 are energized only in the first of these two intervals, and in the following time interval cold dried gas will flow through the chamber, whereby the regenerated adsorbent therein is cooled.

It is understood that each time a time interval determined by the clock-controlled contactor or timer 63 has lapsed the switches $S_1$ and $S_4$ are actuated whereby the heating elements are deenergized by the contactor 62, and thereafter the motor 27 is rotated one angular step forward determined by the actuating disc 46 which changes the positions of the switches $S_2$ and $S_3$, whereafter the contactor 62 reconnects the heating elements 43 to the power supply. However, the rotor 53 has been moved one angular step forward so as to energize the heating element in the next chamber 12 in which the adsorbent is to be regenerated. If, however, the hygrostat 64 ascertains that the moisture content of the dried gas flowing from the apparatus through the outlet tube 14 is below a preset value, the switch $S_0$ is opened. If the switch $S_0$ is still open when the clock-activated contactor 63 opens the switch $S_4$ for disconnecting the heating elements and changes the position of the switch $S_1$ the motor 27 will not be energized before the hygrostat 64 closes the switch $S_0$ which means a prolongation of the air drying period in the majority of chambers 12 as well as of the cooling period of the adsorbent being regenerated in two of the chambers 12.

Figures 10, 11:
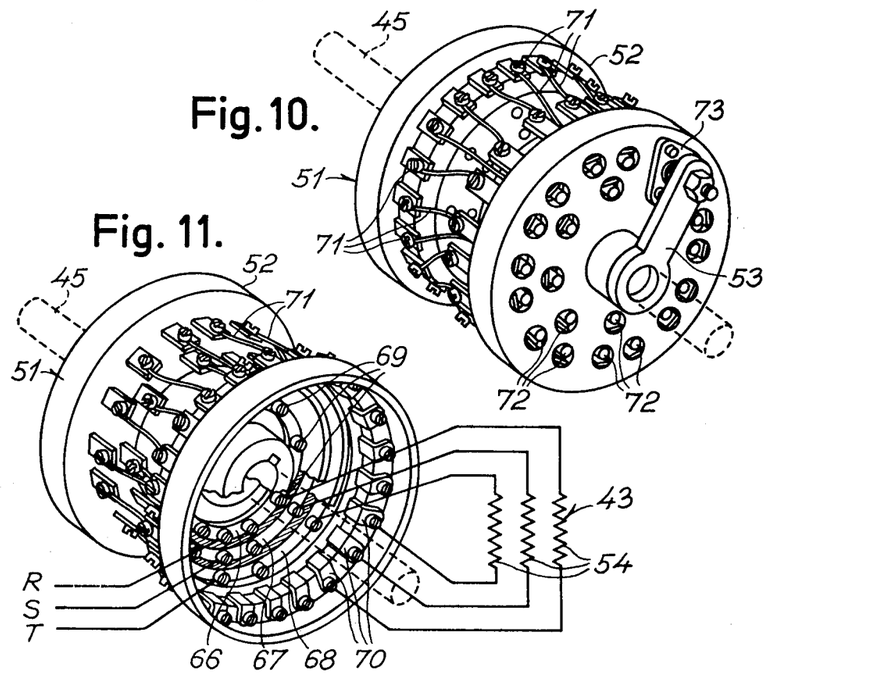
FIGS. 10 and 11 are perspective views in an enlarged scale showing a rotary switching device from opposite ends.

The rotary electrical switching device 51 shown in FIGS. 10 and 11 will now be described more in detail. The stator part 52 comprises a spool-shaped member of an insulating material. At one end the spool member is provided with three radially spaced and mutually insulated metal terminal rings 66, 67, and 68 representing the electrical phases R, S, and T, respectively. These rings are provided with circumferentially space screws 69 or connecting members for electrically connecting the heating elements 43 of the respective chambers 12 thereto. Each heating element 43 comprises three modules 54 as shown in FIG. 13, and one terminal end of each module is connected to a respective one the terminal rings 66, 67, and 68. The terminal ends of the three modules 54 in each heating element 43 is connected to three circumferentially spaced, mutually insulated terminal connecting members 70 arranged concentrically with the rings 66–68. Axially extending electrical conductors 71 connect each of the connecting members 70 to a contact member 72 positioned at the other end surface of the switching device 51, and the contacts 72 are arranged in triangular groups as shown in FIG. 10 so that the three contacts in each group are associated with the same heating element 43. The rotor 53 comprises an arm having a spring biased short-circuiting member or contact plate 73 mounted at its free end. When the shaft 45 is rotated stepwise by the motor 27, the rotor 53 is rotated between positions in which the plate 73 is in tight engagement with all three contacts 72 of a group so as to short-circuit the terminals of the three modules 54 of the associated heating element 43 and thereby energize the same. The electrical switching device shown in FIGS. 10 and 11 comprises eight groups of contacts 72 and is consequently adapted to be used in connection with an apparatus having eight chambers 12. If, however, the dehumidifier has only six chambers as mentioned above, the switching device should, of course, be provided with only six groups of contacts 72.

Figure 16:
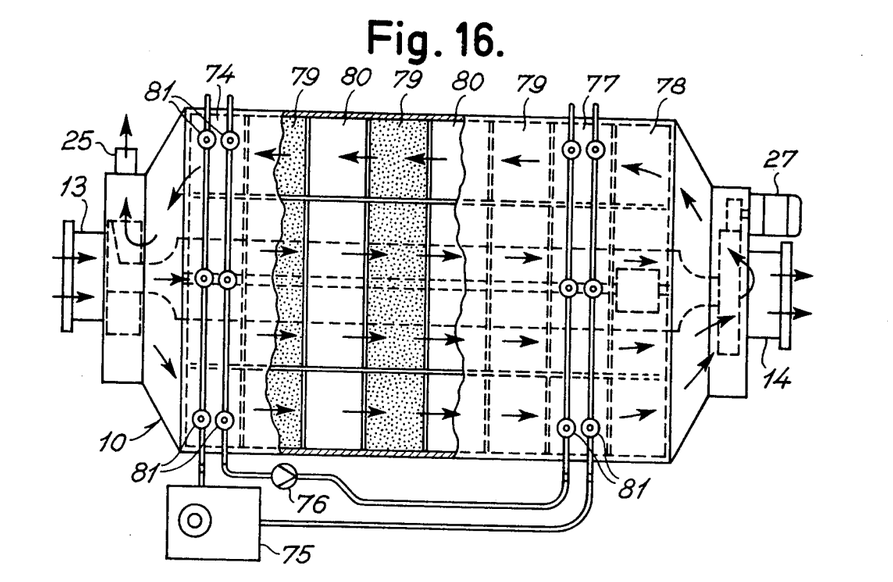
FIG. 16 is a diagrammatic side view and partially sectional view of a fourth embodiment of the apparatus according to the invention.
Figure 17:
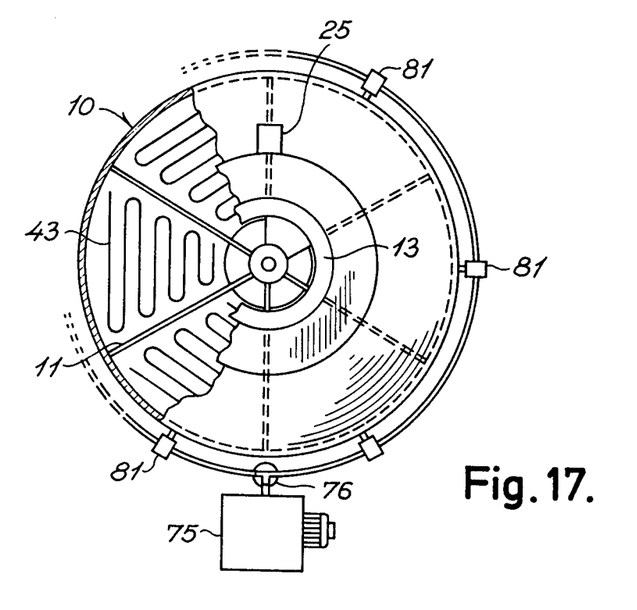
FIG. 17 is a bottom view and partially sectional view of the apparatus shown in FIG. 16.

FIGS. 16 and 17 diagrammatically show an embodiment of the type described in connection with FIGS. 8–12. However, in FIGS. 16 and 17 the chambers or passages 12 are divided into axial sections so that the gas or air to be dried alternately passes cooling or heating sections and adsorbing sections. If, for example, the gas to be dried contains a large amount of moisture, the first section 74 may be a condenser section in which humid gas flowing from the inlet tube 13 is cooled by suitable means so that part of the moisture in the gas is condensed. These cooling means may, for example, be the evaporator of a conventional cooling system or a so-called heat pump, comprising a compressor 75 and a reduction valve 76. The condenser of the cooling system may then be used for heating the dried gas or air in a heating section 77 before the gas flows through a filter section 78 to the outlet tube 14. It may be desired to avoid cooling and heating of the regenerating gas in the condenser section and the heating section, respectively. Therefore, the conduits of the cooling system or heating pump may be provided with solenoid valves 81 by means of which the flow of cooling medium or heat transporting fluid in the conduits of the system may be controlled so that fluid flow is stopped in the chambers or passages 12 in which the adsorbent is being regenerated.

The apparatus shown in FIGS. 16 and 17 also comprises three adsorbing sections 79 containing adsorbing medium and heating elements, and intermediate cooling sections 80 for removing the adsorption heat generated in the preceding adsorbing section. The intermediate cooling sections 80 may comprise cooling means of any suitable type, such as water cooling means, the evaporator of a cooling system or heat pump, etc. The cooling means provided in the intermediate cooling sections 80 should be adapted to cool only in the chambers 12 being passed by gas to be dried, and not in the chambers in which regeneration is taking place. Thus, each intermediate cooling section may comprise a condenser portion and an evaporator portion of a conventional cooling system, controllable valve means being provided to control the flow of fluid in the system so that the condenser portion of the system is at any time to be found in the chamber or chambers in which regeneration of the adsorbent is taking place, while the evaporator portion is present in the other chambers. The apparatus shown in FIG. 16 is preferably arranged with its longitudinal axis in an upright position and with the inlet tube 13 downwards. Moisture condensed and separated in the condenser section 74 may then flow out through the exhaust pipe 25 together with the gas used for regeneration of the adsorbent. The adsorbing sections 74 may contain different types of adsorbents, and any desired combination of condensing, cooling, heating, and adsorbing sections may be provided.

It should be understood that various changes and modifications of the embodiments described above could be made within the scope of the present invention. Furthermore, the features described in connection with the various embodiments could be interchanged. Thus, for example, heating elements of the type shown in FIG. 3 may also be used in connection with the embodiment shown in FIGS. 1–7, and the operation of these embodiments may also be controlled by an electrical control system similar to that shown in FIG. 12. The dehumidifier according to the invention may operate very economically. This is primarily due to the rather small amount of regenerating gas required (for example about 4 percent of the total amount of gas being dried) and the direct and effective heating of the adsorbent during regeneration thereof, as well as the uniform distribution of gas flow over the cross-section of the chambers and the adsorbent contained therein.

I claim:

1. An apparatus for drying or dehumidifying gases and comprising a plurality of chambers each having a gas inlet end and a gas outlet end communicating with a common gas inlet for gas to be dehumidified, and with a common gas outlet for dehumidified gas, respectively, a plurality of spaced layers of a regenerable, moisture adsorbing medium arranged in each of said chambers, selectively energizeable electrical heating means arranged within each of said chambers and extending between adjacent layers of adsorbing medium therein and in heat conducting contact with said layers, unitary rotary valve means rotatable between a number of angular positions corresponding to the number of said plurality of chambers, said valve means being adapted to obstruct the communication between the inlet end of each of a minority of said plurality of chambers and said common gas inlet and to simultaneously communicate each inlet end of said minority of chambers with a gas discharge in each of said angular positions and each outlet end of said minority of chambers with said common gas outlet, whereby gas which has been dehumidified in the remaining chambers may flow through said minority of chambers from said common gas outlet to said gas discharge, and means for energizing said heating means in each of said minority of chambers while such chamber is communicated with said gas discharge.

2. An apparatus according to claim 1, wherein said energizing means are adapted to terminate energizing of said heating means in each of said minority of chambers while said chamber remains in communication with said gas discharge for an additional period of time, whereby the absorbing medium in said chamber is cooled by dehumidified gas flowing through said chamber from said common gas outlet to said gas discharge.

3. An apparatus according to claim 1, further comprising cooling means arranged at said common gas inlet for cooling said gas to be dehumidified in order to condense moisture therein.

4. An apparatus according to claim 3, further comprising heating means arranged at said common gas outlet for heating said dehumidified gas.

5. An apparatus according to claim 4, wherein said cooling means and said heating means comprise an evaporator and a condenser, respectively, of a heat pump system.

6. An apparatus according to claim 5, wherein said adsorbing medium comprises material selected from the group consisting of synthetic mineral fibers, ceramic fibers, molecular sieves, silica gel, and activated alumina.

7. An apparatus according to claim 4, wherein spacing means are arranged between adjacent layers of said sheet material.

8. An apparatus according to claim 4, wherein said adsorbing medium comprises material selected from the group consisting of molecular sieves, silica gel, activated alumina, synthetic mineral fibers, and ceramic fibers.

9. An apparatus according to claim 4, further comprising cooling means arranged at the inlet end of said housing for cooling said gas to be dehumidified so as to condense moisture therein.

10. An apparatus according to claim 9, further comprising heating means arranged at the outlet end of said housing.

11. An apparatus according to claim 10, wherein said cooling means and said heating means comprise an evaporator and a condenser, respectively, of a heat pump system.

12. An apparatus according to claim 4, wherein said moisture adsorbing medium in said chamber is divided into axially spaced sections, cooling means being provided between said spaced sections.

13. An apparatus according to claim 1, wherein said moisture adsorbing medium in each of said chambers is divided into axially spaced sections, cooling means being arranged between said spaced sections.

14. An apparatus according to claim 1, wherein each of said layers of adsorbing medium extends in a longitudinal direction of the respective chamber.

15. An apparatus according to claim 14, wherein adjacent layers of said adsorbing medium are separated by said heating means.

16. An apparatus according to claim 15, wherein said heating means comprise sheet material separating said layers of adsorbing medium.

17. An apparatus according to claim 16, wherein said separating sheet material comprises printed resistance circuits.

18. An apparatus according to claim 17, further comprising spacing means arranged between adjacent layers of said separating sheet material.

19. An apparatus according to claim 18, wherein said adsorbing medium is a particulate material.

20. An apparatus according to claim 14, wherein said layers of adsorbing medium comprise layers of fibrous sheet material.

21. An apparatus according to claim 20, wherein said heating means comprise rod-like spacer members arranged between said layers of adsorbing medium, and electric heating wires extending between said spacer members.

22. An apparatus according to claim 14, wherein said spacing means comprise a corrugated sheet material.

23. An apparatus according to claim 1, wherein said adsorbing medium comprises material selected from the group consisting of molecular sieves, silica gel, activated alumina, synthetic mineral fibers, and ceramic fibers.

24. An apparatus according to claim 1, further comprising a substantially cylindrical housing defining said chambers therein, said valve means being arranged centrally at one end of said chambers, each having a sector-like cross-sectional shape and being arranged annularly and substantially coaxially with said valve.

25. An apparatus according to claim 1, wherein said valve means comprises flow restriction means for restricting flow communication between said common gas outlet and the gas outlet end of each of said minority of chambers.

26. An apparatus according to claim 1, wherein said layers of adsorbing medium in each of said chambers extend transversely to the general direction of gas flow in the respective chamber, each layer being supported by a respective one of a plurality of gas penetrable, heat-conductively interconnected supporting members of a heat-conductive material.

27. An apparatus according to claim 26, wherein said supporting members comprise tray-like members made from wire mesh.

28. An apparatus according to claim 1, wherein the heating means in the respective ones of said plurality of chambers or passages comprise star-connected heating elements, said switching means comprising a contact member for short-circuiting the heating elements at their neutral points in at least one of said minority of chambers so as to energize the heating elements in said one chamber.

29. An apparatus according to claim 28, wherein the neutral point sides of said star-connected heating elements are grouped in a circular arrangement, said short-circuiting contact member being coupled to and rotatable with said rotary valve means so as to secure conformity in the rotational movements of said contact member and said valve means.

30. An apparatus according to claim 1, wherein
said selectively energizeable electrical heating means is arranged within each of said chambers and extending between said adjacent layers of adsorbing medium so as to separate said layers of adsorbing medium and so as to define a gas flow passage through each of said layers.

31. An apparatus for drying or dehumidifying gases and comprising
a housing defining a plurality of separate chambers therein and having an inlet end defining an inlet for gas to be dehumidified, and an outlet end defining an outlet for dehumidified gas, each of said chambers or passages communicating at its opposite ends with said gas inlet and said gas outlet ends, respectively,
a regenerable moisture adsorbing medium arranged within each of said chambers or passages, said adsorbing medium being divided into a plurality of adjacent spaced layers,
selectively energizeable electrical heating means arranged within each of said chambers or passages and extending between adjacent layers of adsorbing medium therein and in contact with each such layer,
means for directing gas to be dehumidified from said inlet end through a first group of said plurality of chambers or passages, said plurality of chambers comprising a first group and a second group,
means for simultaneously redirecting a flow of dehumidified gas from said outlet end through said second group of chambers or passages,
means for energizing said heating means in each of the chambers or passages in said second group for a period of time sufficient to regenerate adsorbing medium therein while dehumidified gas is being directed therethrough, cooling means arranged at said inlet end of the housing for cooling said gas to be dehumidified in order to condense moisture therein, heating means arranged at said outlet end of the housing for heating said dehumidified gas, and said cooling means and said heating means comprising an evaporator and a condenser, respectively, of a heat pump system.

32. An apparatus for drying or dehumidifying gases and comprising a housing defining a plurality of separate chambers therein and having an inlet end defining an inlet for gas to be dehumidified, and an outlet end defining an outlet for dehumidified gas, each of said chambers or passages communicating at its opposite ends with said gas inlet and said gas outlet ends, respectively, a regenerable moisture adsorbing medium arranged within each of said chambers or passages, said adsorbing medium being divided into a plurality of adjacent spaced layers, selectively energizeable electrical heating means arranged within each of said chambers or passages and extending between adjacent layers of adsorbing medium therein and in contact with each such layer, means for directing gas to be humidified from said inlet end through a first group of said plurality of chambers or passages, said plurality of chambers comprising a first group and a second group, means for simultaneously redirecting a flow of dehumidified gas from said outlet end through said second group of chambers or passages, means for energizing said heating means in each of the chambers or passages in said second group for a period of time sufficient to regenerate adsorbing medium therein while dehumidified gas is being directed therethrough, each of said layers of adsorbing medium extends in a longitudinal direction of the respective chamber or passage, adjacent layers of said adsorbing medium being separated by said heating means, said heating means comprising sheet material separating said layers of adsorbing medium, said separating sheet material comprising printed resistance circuits, spacing means arranged between adjacent layers of said separating sheet material, said adsorbing medium comprising a particulate material selected from the group consisting of molecular sieves, silica gel, activated alumina, synthetic mineral fibers, and ceramic fibers, said gas redirecting means comprising a valve adapted to cut off the communication between said gas inlet and the adjacent end or ends of said second group of chambers, and to connect said chamber end or ends to the atmosphere, and said housing being substantially cylindrical and said valve being a rotary valve arranged centrally at one end of the chambers or passages each having a sector-like cross-sectional shape and being arranged annularly and substantially coaxial with said valve.

33. An apparatus according to claim 32, wherein said valve comprises flow restriction means for restricting flow communication between said gas outlet and said second group of chambers.

34. An apparatus for drying or dehumidifying gases and comprising a housing defining a plurality of separate chambers therein and having an inlet end defining an inlet for gas to be dehumidified, and an outlet end defining an outlet for dehumidified gas, each of said chambers or passages communicating at its opposite ends with said gas inlet and said gas outlet ends, respectively, a regenerable moisture adsorbing medium arranged within each of said chambers or passages, said adsorbing medium being divided into a plurality of adjacent spaced layers, selectively energizeable electrical heating means arranged within each of said chambers or passages and extending between adjacent layers of adsorbing medium therein and in contact with each such layer, means for directing gas to be dehumidified from said inlet end through a first group of said plurality of chambers or passages, said plurality of chambers comprising a first group and a second group, means for simultaneously redirecting a flow of dehumidified gas from said outlet end through said second group of chambers or passages, means for energizing said heating means in each of the chambers or passages in said second group for a period of time sufficient to regenerate adsorbing medium therein while dehumidified gas is being directed therethrough, each of said layers of adsorbing medium extending in a longitudinal direction of the respective chamber or passage, adjacent layers of said adsorbing medium being separated by said heating means, said heating means comprising sheet material separating said layers of adsorbing medium, said separating sheet material comprising printed resistance circuits, spacing means arranged between adjacent layers of said separating sheet material, said adsorbing medium comprising a particulate material selected from the group consisting of molecular sieves, silica gel, activated alumina, synthetic mineral fibers, and ceramic fibers, and said gas redirecting means comprising a valve adapted to cut off the communication between said gas inlet and the adjacent end or ends of said second group of chambers, and to connect said chamber end or ends to the atmosphere.

35. An apparatus for drying or dehumidifying gases and comprising a housing having a gas inlet and a gas outlet at opposite ends and defining at least one chamber therein, a regenerable and gas penetrable moisture adsorbing medium arranged within said chamber and divided into a plurality of adjacent layers, selectively energizeable electrical heating means arranged between and in contact with said adjacent layers of adsorbing medium so as to separate said layers of adsorbing medium and so as to define a gas flow passage through each of said layers, said layers extending in a longitudinal direction of said chamber, said heating means comprising layers of sheet material separating said layers of adsorbing medium and defining between adjacent layers of sheet material gas flow passages communicating with said gas inlet and said gas outlet, cooling means arranged at the inlet end of said housing for cooling said gas to be dehumidified so as to condense moisture therein, heating means arranged at the outlet end of said housing, and said cooling means and said heating means comprising an evaporator and a condenser, respectively, of a heat pump system.

36. An apparatus for adsorption treatment of gases and comprising a plurality of chambers each having a gas inlet end and a gas outlet end communicating with a common gas inlet for gas to be subjected to adsorption, and with a common gas outlet for treated gas, respectively, a plurality of spaced layers of a regenerable, adsorbing medium arranged in each of said chambers, selectively energizeable electrical heating means arranged within each of said chambers and extending between adjacent layers of adsorbing medium therein and in heat conducting contact with said layers, unitary rotary valve means rotatable between a number of angular positions corresponding to the number of said plurality of chambers, said valve means being adapted to obstruct the communication between the inlet end of each of a minority of said plurality of chambers and said common gas inlet and to simultaneously communicate each inlet end of said minority of chambers with a desorbing gas discharge in each of said angular positions and each outlet end of said minority of chambers with said common gas outlet, whereby gas which has been treated in the remaining chambers may flow through said minority of chambers from said common gas outlet to said gas discharge, and means for energizing said heating means in each of said minority of chambers while such chamber is communicated with said gas discharge.

* * * * *